(12) United States Patent
Perraud

(10) Patent No.: US 12,348,972 B2
(45) Date of Patent: Jul. 1, 2025

(54) SYSTEMS AND METHODS OF ASSESSING A PLAUSIBILITY OF A RANGING MEASUREMENT

(71) Applicant: Qorvo US, Inc., Greensboro, NC (US)

(72) Inventor: Eric Perraud, Plaisance du Touch (FR)

(73) Assignee: Qorvo US, Inc., Greensboro, NC (US)

( * ) Notice: Subject to any disclaimer, the term of this patent is extended or adjusted under 35 U.S.C. 154(b) by 617 days.

(21) Appl. No.: 17/690,409

(22) Filed: Mar. 9, 2022

(65) Prior Publication Data

US 2023/0292132 A1 Sep. 14, 2023

(51) Int. Cl.
| | | |
|---|---|---|
| *H04W 12/63* | (2021.01) | |
| *G01S 7/4865* | (2020.01) | |
| *G06F 18/23* | (2023.01) | |
| *G06F 18/2433* | (2023.01) | |
| *H01Q 5/25* | (2015.01) | |
| *H04W 12/122* | (2021.01) | |
| *H04L 25/02* | (2006.01) | |

(52) U.S. Cl.
CPC ............ *H04W 12/63* (2021.01); *G01S 7/4865* (2013.01); *G06F 18/23* (2023.01); *G06F 18/2433* (2023.01); *H01Q 5/25* (2015.01); *H04W 12/122* (2021.01); *H04L 25/0212* (2013.01)

(58) Field of Classification Search
CPC ...... H04W 12/63; H04W 12/122; H01Q 5/25; H04L 25/0212; G06F 18/2433; G06F 18/23; G01S 7/4865
See application file for complete search history.

(56) References Cited

U.S. PATENT DOCUMENTS 11,425,664 B1 * 8/2022 Garg .................. H04W 4/40
2009/0327342 A1 * 12/2009 Xiao .................. G06F 16/29

(Continued)

FOREIGN PATENT DOCUMENTS

EP 3448072 A1 2/2019

OTHER PUBLICATIONS

Extended European Search Report for European Patent Application No. 23156837.9, mailed Aug. 17, 2023, 7 pages.
Author Unknown, "IEEE Standard for Low-RateWireless Networks, Amendment 1: Enhanced Ultra Wideband (UWB) Physical Layers (PHYs) and Associated Ranging Techniques," IEEE Std 802.15.4z™-2020, Jun. 2020, IEEE Computer Society, The Institute of Electrical and Electronics Engineers, Inc., 174 pages.

(Continued)

*Primary Examiner* — Steven S Kelley
(74) *Attorney, Agent, or Firm* — Withrow & Terranova, P.L.L.C.

(57) ABSTRACT

Systems and methods of assessing a plausibility of a ranging measurement are provided. In some embodiments, a method of assessing a plausibility of a ranging measurement includes: obtaining the ranging measurement from a remote device; obtaining one or more measurements associated with the ranging measurement; and based on the one or more measurements associated with the ranging measurement, determining the plausibility of the ranging measurement. The embodiments disclosed herein determine the reliability of the measured range and thus enforce the security level of Ultra-WideBand (UWB) transactions to be secured. Some embodiments are based on existing and standardized metrics. Some embodiments include a capability to auto-assess whether it is reliable to estimate the plausibility of the transaction range. In some embodiments, the computations needed are relatively simple and can be performed by relatively simple devices.

20 Claims, 15 Drawing Sheets

(56) References Cited

U.S. PATENT DOCUMENTS

| | | | |
|---|---|---|---|
| 2014/0194145 A1* | 7/2014 | Do | G01S 5/021 |
| | | | 455/67.11 |
| 2019/0068639 A1* | 2/2019 | Alexander | H04W 4/46 |
| 2020/0106877 A1 | 4/2020 | Ledvina et al. | |
| 2020/0408868 A1 | 12/2020 | Eggert | |
| 2021/0041521 A1* | 2/2021 | Canedo Rodriguez | |
| | | | G01S 5/0264 |
| 2021/0258756 A1* | 8/2021 | Mcdougall | G06Q 10/0635 |
| 2022/0272483 A1* | 8/2022 | George | H04L 67/1097 |
| 2022/0394101 A1* | 12/2022 | Feinmesser | H04L 67/535 |
| 2024/0272928 A1* | 8/2024 | Labriji | G06F 9/45558 |

OTHER PUBLICATIONS

Melepe, "A bit of Machine Learning with SVMs," Aug. 21, 2020, [retrieved on Jun. 6, 2022]. Retrieved from the Internet: <URL: https://zestedesavoir.com/tutoriels/1760/un-peu-de-machine-learning-avec-les-svm/>, 18 pages.

Dromard, J. et al., "Online and Scalable Unsupervised Network Anomaly Detection Method," IEEE Transactions on Network and Service Management, vol. 14, Issue 1, Nov. 2016, IEEE, 16 pages.

Ippoliti, D. et al., "Online Adaptive Anomaly Detection for Augmented Network Flows," 2014 IEEE 22nd International Symposium on Modelling, Analysis & Simulation of Computer and Telecommunication Systems, Sep. 9-11, 2014, Paris, France, IEEE, 10 pages.

\* cited by examiner

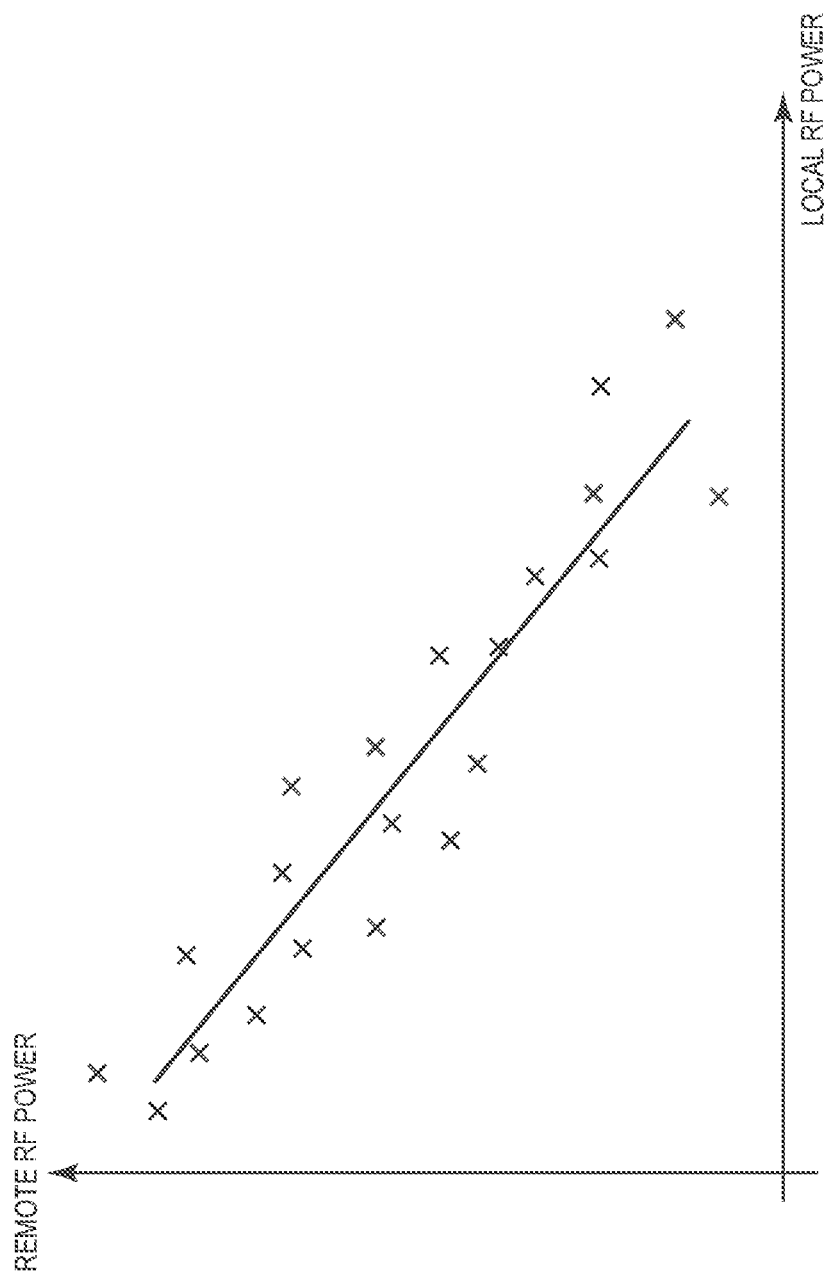

SYSTEMS AND METHODS OF ASSESSING A PLAUSIBILITY OF A RANGING MEASUREMENT

FIELD OF THE DISCLOSURE

The current disclosure relates generally to validating ranging measurements.

BACKGROUND

Ultra-WideBand (UWB) is a technology for short-range, low-cost, low-power communications, focusing on transactions between Internet of Things (IoT) devices.

These transactions may be unsecure: they can suffer of relay-attack or man-in-the-middle attacks. FIG. 1 illustrates the principle of relay attack.

As shown in FIG. 1, the vehicle (or more generally an initiator device) periodically transmits a radio ciphered challenge to discover the vehicle owner key fob (or more generally a responder device). The radio communication range is typically a few meters. In normal mode, the key fob decodes and deciphers the challenge. If the decoding and deciphering are successfully accomplished, the key fob sends a ciphered response. The vehicle decodes and deciphers the response and if it is successfully authenticated, the doors are unlocked. An attacker can unlock the door with a simple radio. If the car owner has parked the vehicle and then is working far away off the vehicle, an attacker can simply amplify and relay the radio challenge signal until the signal is received by the owner key fob. Since the received challenge is unmodified by the radio relay, the key fob successfully decodes and deciphers the challenge and considers it a valid challenge. The key fob then sends a ciphered response. The radio relay of the attacker amplifies the response so that it is received by the vehicle. The vehicle decodes the response as the expected response and therefore unlocks the door. The attacker then has unauthorized access to the vehicle. Another simple attack is the Man-In-The-Middle (MITM) attack.

Improved systems and methods for ranging measurements are needed.

SUMMARY

Systems and methods of assessing a plausibility of a ranging measurement are provided. In some embodiments, a method of assessing a plausibility of a ranging measurement includes: obtaining the ranging measurement from a remote device; obtaining one or more measurements associated with the ranging measurement; and based on the one or more measurements associated with the ranging measurement, determining the plausibility of the ranging measurement.

The embodiments disclosed herein determine the reliability of the measured range and thus enforce the security level of Ultra-WideBand (UWB) transactions to be secured. Some embodiments are based on existing and standardized metrics. Some embodiments include a capability to auto-assess whether it is reliable to estimate the plausibility of the transaction range. In some embodiments, the computations needed are relatively simple and can be performed by relatively simple devices.

UWB ranging involves two UWB devices exchanging ranging messages. The initiator must know the reply time of the responder. Therefore, the ranging principle relies on that both devices are trustable and do not lie when reporting their respective timing measurement. However, a malicious device may intentionally report a reply time which is not the effective reply time. The idea is to collect other physical UWB metrics for every ranging round and to build a dataset of n-dimension vectors (like received power, channel impulse response . . . ). Since there is some correlation between these metrics, these vectors will not occupy the full n-D space but will aggregate in some clusters. When UWB ranging is done with a malicious or misfunctioning device, it will be an outlier in the n-D dataset. This will be detected with an unsupervised or semi-supervised Machine Learning algorithm, aka a Grid Clustering or one-class SVM algorithm. If such vector is detected as an outlier, the plausibility of the ranging value is suspicious.

In some embodiments, a computing device for assessing a plausibility of a ranging measurement, comprising at least one processor, the at least one processor being configured to: obtain the ranging measurement from a remote device; obtain one or more measurements associated with the ranging measurement; and based on the one or more measurements associated with the ranging measurement, determine the plausibility of the ranging measurement.

In some embodiments, the ranging measurement is part of a UWB transaction.

In some embodiments, the one or more measurements associated with the ranging measurement comprise one or more of the group consisting of: received channel power from the remote device; a Channel Impulse Response, (CIR) associated with the ranging measurement; a Time of Flight (ToF) associated with the ranging measurement; a received channel power of the remote device; and an angle of arrival associated with the ranging measurement.

In some embodiments, determining the plausibility of the ranging measurement comprises: comparing the one or more measurements associated with the ranging measurement with a model of expected values for a plausible ranging measurement.

In some embodiments, the model of expected values for a plausible ranging measurement is the result of an unsupervised clustering algorithm of known plausible ranging measurements.

In some embodiments, the unsupervised clustering algorithm comprises a digital grid clustering algorithm.

In some embodiments, comparing the one or more measurements associated with the ranging measurement with the model of expected values for a plausible ranging measurement comprises: projecting the one or more measurements associated with the ranging measurement into digital cells of an n-dimensional space; determining a density of the digital cells and a global state anomaly score; determining an anomaly score for the one or more measurements associated with the ranging measurement; and determining the plausibility of the ranging measurement by comparing the anomaly score with the state anomaly score.

In some embodiments, the method also includes determining the reliability of the model of expected values for a plausible ranging measurement.

In some embodiments, determining the reliability of the model of expected values for a plausible ranging measurement is based on the number of dense cells of the model and the number of past measurements out of the cluster of dense cells.

In some embodiments, determining the plausibility of the ranging measurement comprises: comparing the one or more measurements associated with the ranging measurement with a one-class State Vector Machine (SVM) algorithm which predicts whether the ranging measurement is plausible.

In some embodiments, the method also includes, if the ranging measurement is determined to not be plausible within a threshold, retraining the model using the one or more measurements associated with the ranging measurement.

In some embodiments, the method also includes assessing a reliability of the plausibility determination, based on a generalization loss of cross-validation done when the model is trained or re-trained.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 15 illustrates the expected distribution of the n-D measurement space when projected on the 2D space (local Radio Frequency (RF) power vs remote RF power), according to some embodiments of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
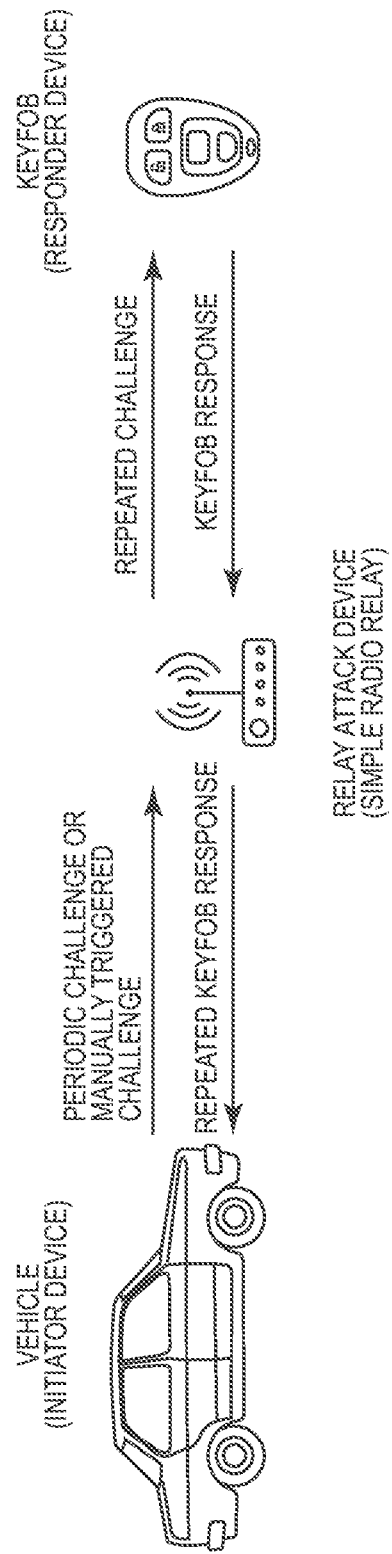
FIG. 1 illustrates the principle of relay attack.
Figure 2:
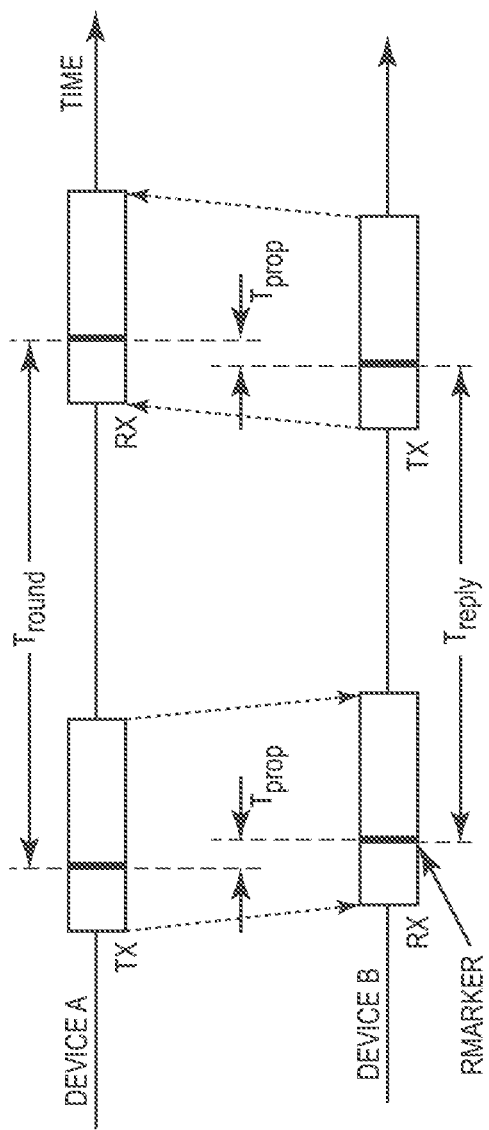
FIG. 2 shows the principle for a single-sided ranging procedure.

As discussed above, Relay attacks and Man-In-The-Middle (MITM) attacks can allow an attacker unauthorized access to secured resources. These attacks typically can happen when the devices which are supposed to participate to the transaction are in an unexpected communication range or are out-of-range. In the first example, if the vehicle and the key fob were able to measure their distance or the Time of Flight (TOF) of the transaction, they would discover that the distance is much larger than the UWB communication range when there is a relay attack. Therefore, combining short-range communication with a ranging capability allows to secure the transaction. In some embodiments, the vehicle would unlock the door only if the key fob is close. Institute of Electrical and Electronics Engineers (IEEE) 802.15.4z is a standard for low-rate wireless networks and includes UWB Physical Layers (PHYs) and associated ranging techniques for such secure communications. IEEE 802.15.4z defines ranging mechanisms which use a UWB pulse to measure the distance or the TOF between the devices participating to the transaction. FIG. 2 (FIG. 6.47a from IEEE 802.15.4z) shows the principle for a single-sided ranging procedure. The initiating device (i.e., Device A) can determine the TOF using the formula:

$$TOF = \frac{T_{round} - T_{reply}}{2}$$

Figure 3:
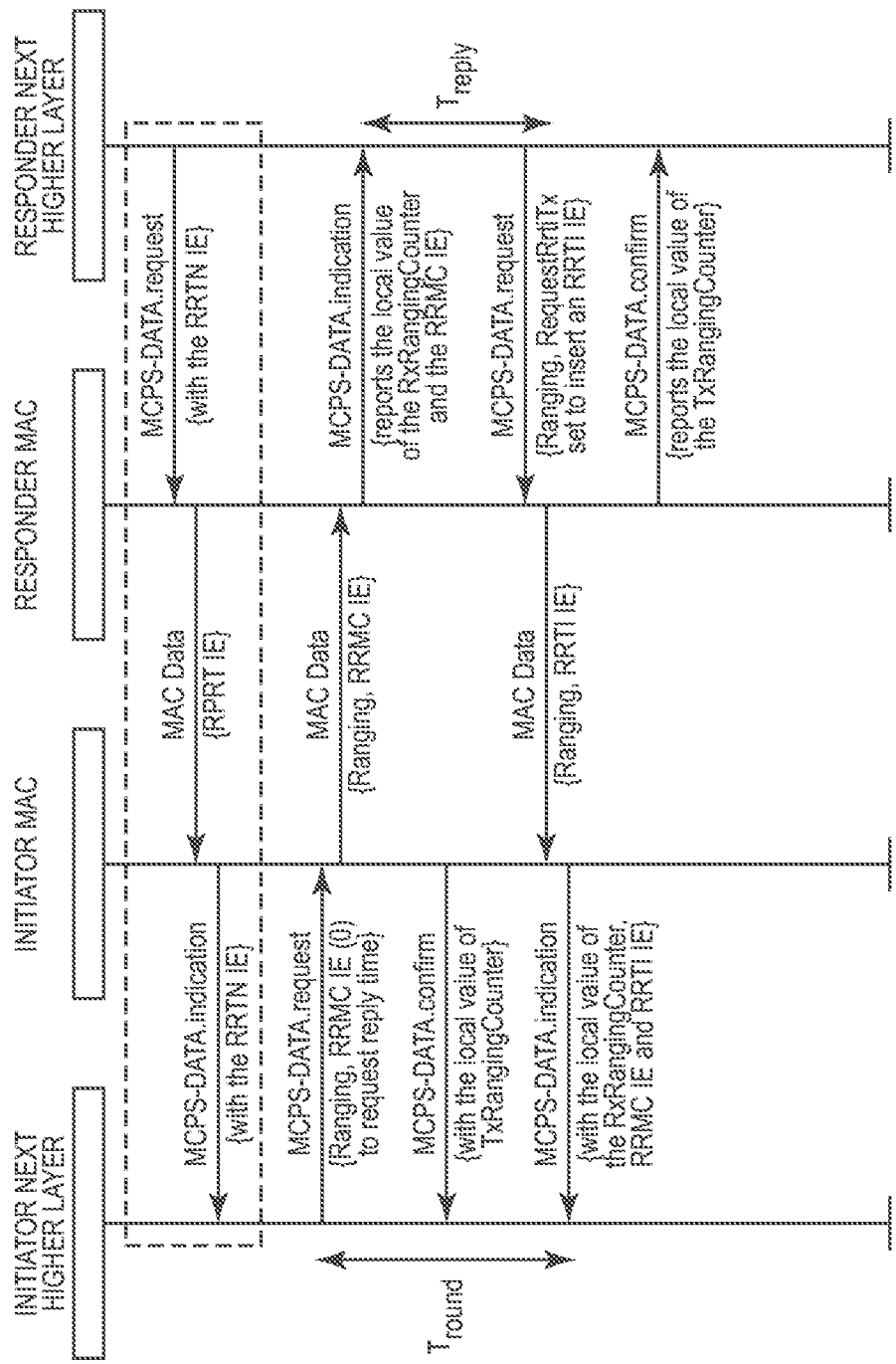
FIG. 3 illustrates an example of how the Time of Flight (TOF) can be included in the authentication method.

FIG. 3 (FIG. 6.48b from IEEE 802.15.4z) illustrates an example of how the TOF can be included in the authentication method. In this case, the initiating device (Device A) sends a UWB frame (e.g., Media Access Control (MAC) data) with the transaction data itself, a flag indicating that a ranging procedure shall be done and the ranging configuration Information Element (IE); it also timestamps the initiating frame of the transaction as $T_{round,tx}$. The responding device replies with a delay $T_{reply}$ and inserts this delay in its reply (called Ranging Reply Time Instantaneous (RRTI) Information Element (IE)). The initiating device time timestamps the reply when it receives it as $T_{round,rx}$. Then it can compute $T_{round}=T_{round,rx}-T_{round,tx}$ and then TOF. RRTI may be included in the reply or may be sent in a deferred message. $T_{reply}$ can also be a known delay which has been previously agreed between both devices either by an out-of-band mechanism or by using a Ranging Reply Time Negotiation (RRTN) IE.

But Device B can be a malicious device and fool an access system in two ways. A malicious device can foreshorten the arrival timestamp of the reply by time-shifting the periodic sequence of the known preamble pattern so that it appears as an earlier arriving signal; but this issue has been resolved in 802.15.4az in adding a secure pattern (e.g., a Scrambled Time Stamp pattern) which is used to assess the arrival time of the message.

Additionally, a malicious device can intentionally lie on $T_{reply}$, meaning that RRTI in the response is intentionally not the reply delay. Or it may not follow the agreed reply delay and send its response with another delay. Similarly, Device B may be misfunctioning. As an example, the device might not be able to accurately timestamp the received message, its transmission time might not be deterministic, and/or the delay from the base-band part of the device to the antenna (or vice-versa) may not be accurately calibrated.

Figure 4:
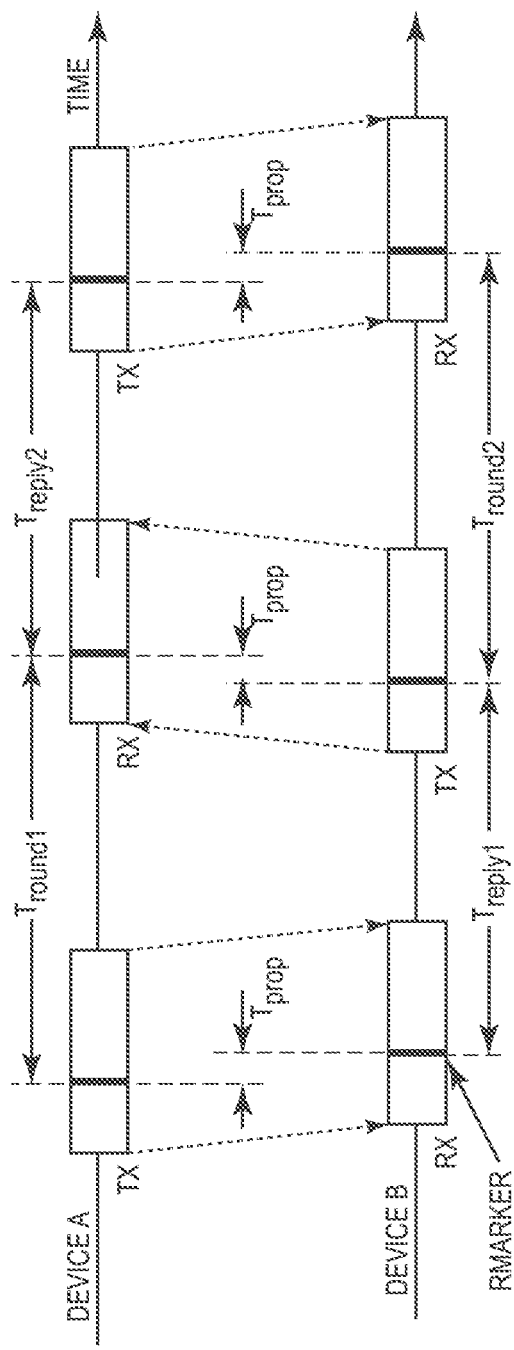
FIG. 4 illustrates a double-sided ranging mechanism.

FIG. 4 (FIG. 6.47c from IEEE 802.15.4z) illustrates a similar issue can happen in the double-sided ranging mechanism. In this example, TOF can be computed with the formula:

$$TOF = \frac{T_{round1} * T_{round2} - T_{reply1} * T_{reply2}}{T_{round1} + T_{round2} + T_{reply1} + T_{reply2}}$$

Figure 5:
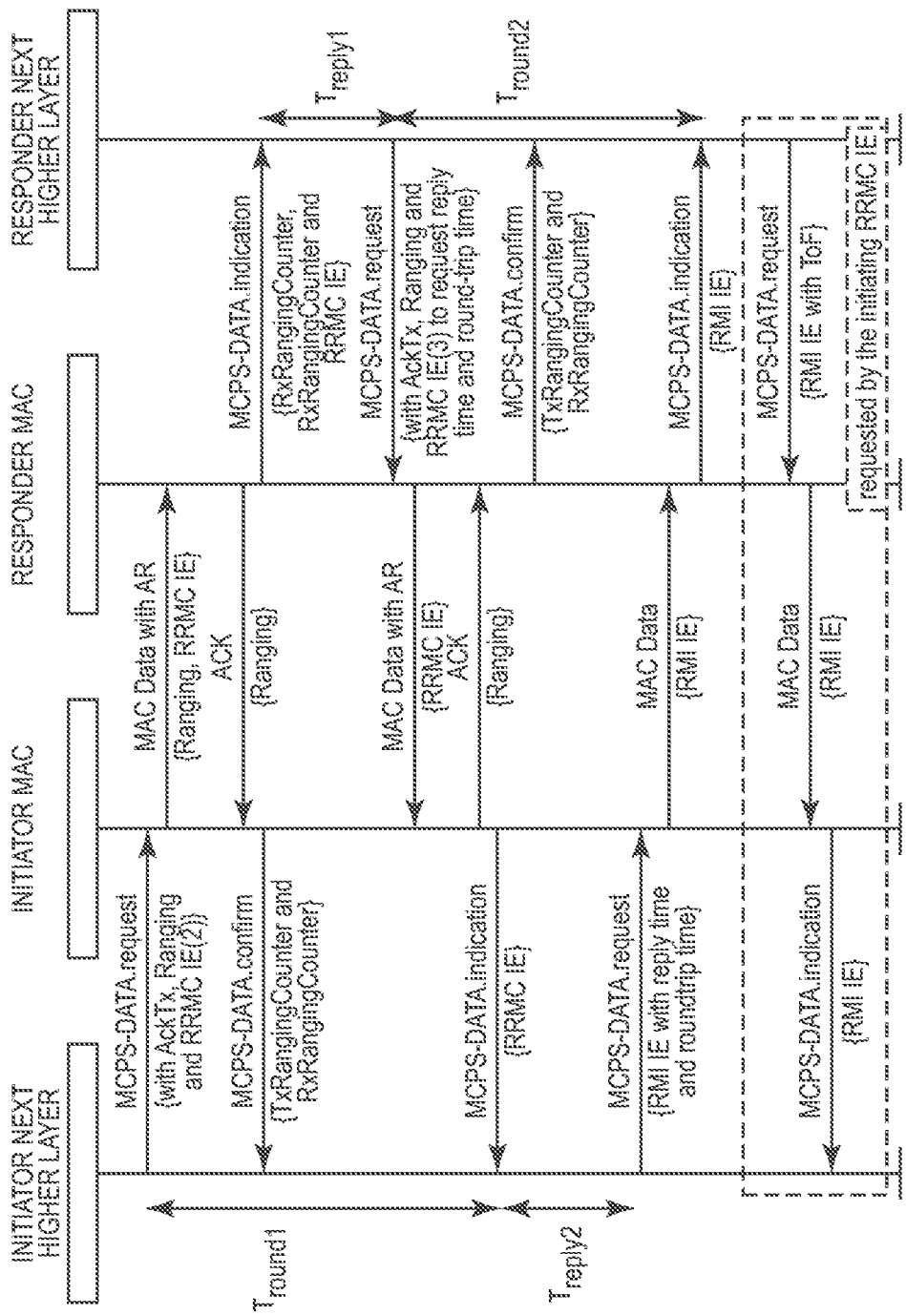
FIG. 5 illustrates an example of how additional information can be included within a double-sided ranging mechanism, according to some embodiments of the present disclosure.

This mechanism is less sensitive to differential clock shift. FIG. 5 (FIG. 6.48d from IEEE 802.15.4z) illustrates an example of how this mechanism could be accomplished. The responding device has all the needed information to compute the TOF: $T_{reply1}$ and $T_{round2}$ are both known. In the first reply, the responding device requested that the initiating device sends $T_{round1}$ and $T_{reply2}$, (Ranging Request Measurement and Control (RRMC IE)=3 to request reply time=$T_{reply2}$ and round-trip time=$T_{round1}$). The initiating device sends the requested information using the Ranging Measurement Information (RMI) IE. Then the responding device sends back the TOF to the initiating device in the latest MAC frame.

Like in the case of Single-Side ranging, the responding device may lie and intentionally report a wrong RMI to the initiating device. Or it may be misfunctioning and report a wrong RMI.

Therefore, the ranging mechanism cannot guarantee fully secure short-range transactions if one device lies about the reply time. Some embodiments disclosed herein propose a technique to assess the plausibility of the ranging mechanism and thus enforce the security level of the transaction.

Systems and methods of assessing a plausibility of a ranging measurement are provided. In some embodiments, a method of assessing a plausibility of a ranging measurement includes: obtaining the ranging measurement from a remote device; obtaining one or more measurements associated with the ranging measurement; and based on the one or more measurements associated with the ranging measurement, determining the plausibility of the ranging measurement.

The embodiments disclosed herein determine the reliability of the measured range and thus enforce the security level of UWB transactions to be secured. Some embodiments are based on existing and standardized metrics. Some embodiments include a capability to auto-assess whether it is reliable to estimate the plausibility of the transaction range. In some embodiments, the computations needed are relatively simple and can be performed by relatively simple devices.

Figure 6:
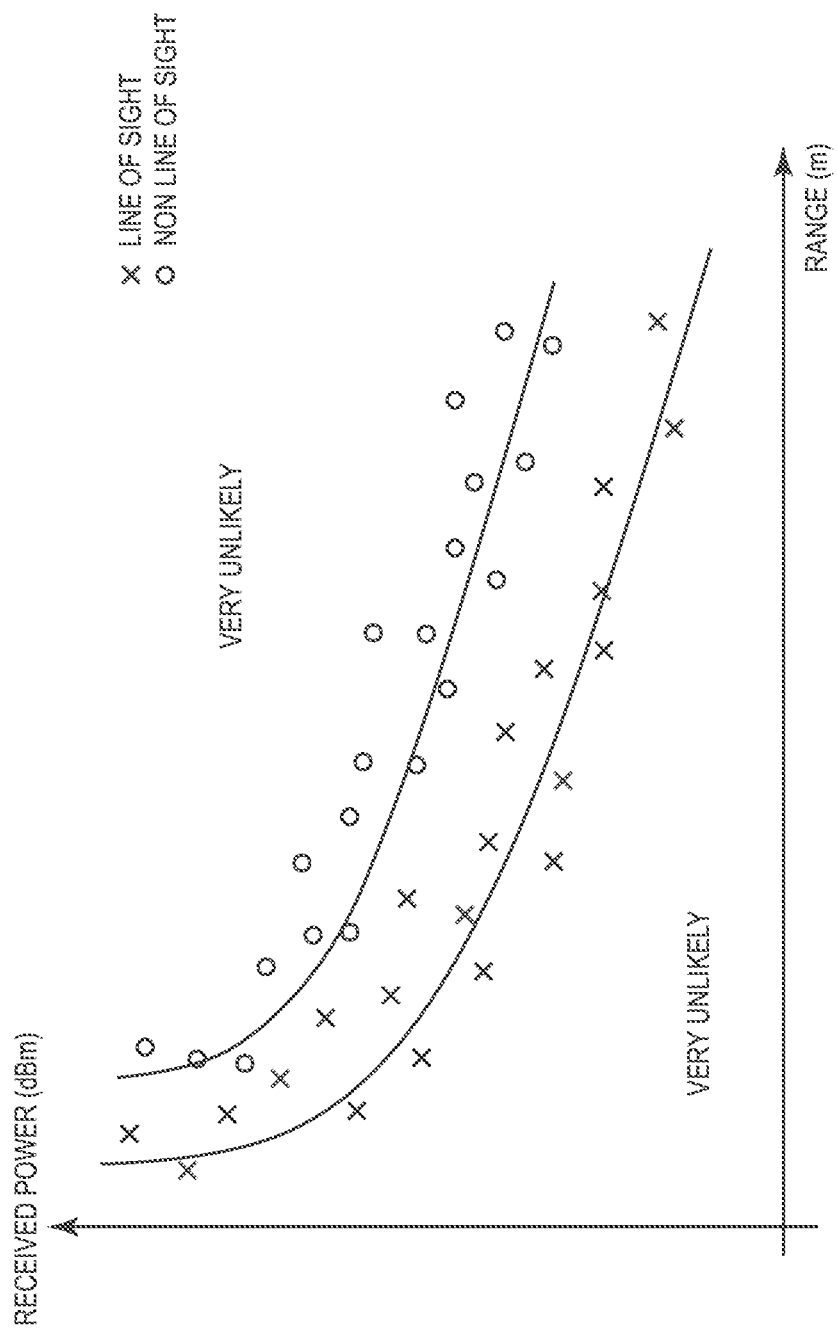
FIG. 6 illustrates a correlation between the range and the received power, according to some embodiments of the present disclosure.

In some embodiments, physical UWB metrics are correlated with the computed range. FIG. 6 illustrates a correlation between the range and the received power. Assuming that all devices transmit at the same power (or assuming that the initiating device knows the transmit power of the remote device), the tuples (range, received power) should typically be scattered along the bottom line in case of Line of Sight (LOS) transaction or along the top line in case of NLOS. The cases where range is very high and received power is very high are very suspicious. Similarly, the cases where range=short and received power=very low are also suspicious (e.g., unlikely). Determining what measurements are likely allows the plausibility of the reported or computed TOF to be assessed.

In some embodiments, a N-dimensional space of physical UWB metrics which have some correlation with the distance between the devices is constructed. This can be used to determine the subspaces of this N-dimensional space which are plausible, suspicious, and very suspicious. The idea is not to a-priori compute the top or the bottom lines because they strongly depend on the location of the transaction, of the transmit power, of the neighbor devices, etc. Instead, some embodiments include characterizing the "normal" transactions and determining the hypervolume (in the n-D space) where the vectors of normal transactions are located. When the vector of a transaction is outside this expected hypervolume, the ranging result is considered suspicious.

A first example describes an access system in a hotel. To lock or unlock the door of a room, the access system will consider transactions whose distance key fob-door is less than 2 meters, for example. For any distance d<2 meters, the received power of the key fob should be in $[P_{rx-min}(d)-P_{rx-max}(d)]$; the radio channel can also be characterized for any such distance, let us say that it includes a single strong ray for any d<1 meter and two rays for 1 meter<d<2 meters. Any transaction with a device which claims a distance d<2 meters but with received power outside of $[P_{rx-min}(d)-P_{rx-max}(d)]$ and with a radio channel showing multiple rays (which would likely be the case with an attacker) is suspicious.

A second example describes a domotic system. As used herein, a domotic system includes home automation (e.g., a smart home or smart house) which can monitor and/or control features such as lighting, climate, appliances, and/or entertainment systems. A domotic system can also include home security features such as access control and alarm systems.

In this example, a fob is used to open the home door and the garage, a controller for the garage door. UWB allows measurement of the range of the fob to the controller but also its angle with two antennas. By comparing the phase of the received UWBpreamble signal or STS signal on the two antennas, the controller can also estimate the angle of arrival of the UWB signal. The STS signal is a physical signal which allows to timestamp a UWB signal in a secure manner. Let us say that the angle is positive when the fob is inside the garage and negative when it is outside garage. When the fob is inside the garage, there can be multiple rays in the received signal because of the many multipaths; when the fob is outside the garage, there should be fewer rays for the distances of interest. If the received signal of the transaction shows many multiple rays with a positive angle (e.g., outdoor) although the estimated distance is in the expected range, the transaction can be tagged as suspicious.

Therefore, for each transaction which needs to be secured with a ranging measurement, the following PHY UWB metrics are collected:
  a. Received Channel Power Indicator (RCPI) averaged over all received frames of the transaction (aka replies and ACK frames)
  b. Transmit power of the responding signal: if not known, it is the default Tx power.

c. Information about the Channel Impulse Response (CIR)

Also, the angle of arrival could be considered as shown in the example. For the sake of simplicity, it is omitted in the remaining discussions but can be applied too.

The CIR also allows for characterization of the LOS vs NLOS behaviors. With UWB, the instantaneous CIR is indeed known by any coherent UWB receiver when it determines the timing arrival of the first symbol of the frame at the antenna by using the autocorrelation properties of the preamble or of the STS pattern.

The CIR metrics used here may consist of one or more of:
  a. $\delta t_i$=time difference between the leading CIR ray and the ith echo (whose power exceeds a given threshold);
  b. $\delta p_i$=power ratio between the leading CIR pulse and the ith echo; and
  c. Number of rays (whose power exceeds a given threshold).

Figure 7:
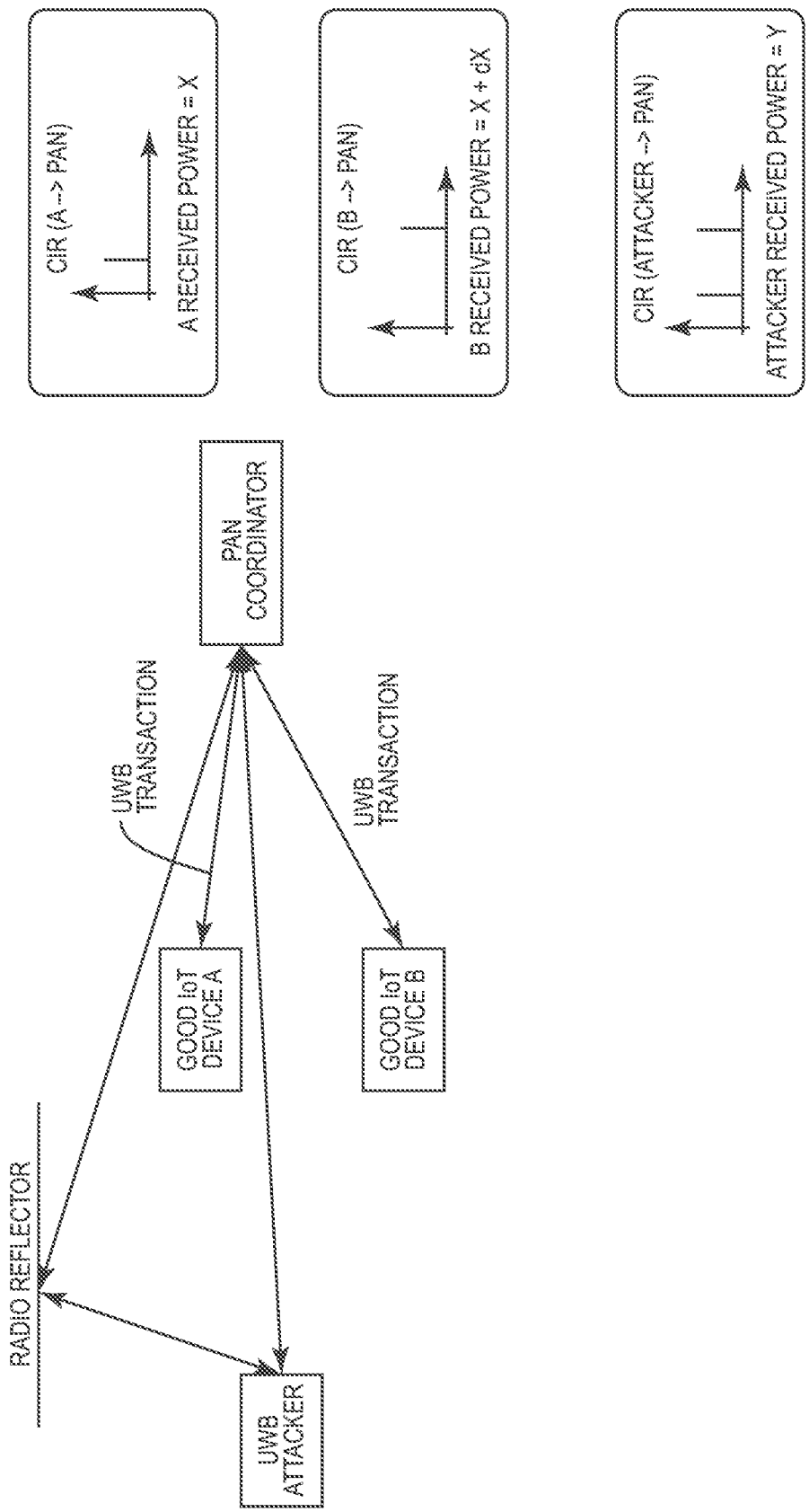
FIG. 7 illustrates how the Channel Impulse Response (CIR) could contribute to identify an attacker, according to some embodiments of the present disclosure.

It can also be split as two CIR metrics: one which is derived from the UWB preamble pattern and one which is derived from the STS pattern. In some embodiments, there is one CIR per antenna (to measure Angle of arrival, two antennas are needed). Or it may be reduced to a subset like:
  a. $\delta t_s$=time difference between the leading CIR pulse and the strongest echo (if the leading pulse is the strongest or if there is no detected multipath echo, it is null);
  b. $\delta p_s$=power ratio between the leading CIR pulse and the strongest echo (if the leading pulse is the strongest or if there is detected no multipath echo, it is null);
  c. Number of rays FIG. 7 illustrates how the CIR could contribute to identify an attacker, according to some embodiments of the present disclosure. In normal operation, IoT devices communicate with a Personal Area Network (PAN) coordinator in LOS conditions and no multipath conditions. The attacker sends a $T_{reply}$ data larger than the effective reply delay so that it foreshortens the distance to the PAN coordinator. However, the CIR and received power of this transmission are significantly different than those of good devices (e.g., not an attacker).

Therefore, for every secure $k^{th}$ transaction involving a ranging procedure, a vector of Phy Metrics $X_k=(R_k, \text{avgRx}_k, Tx_k, CIR_k)$, with $R_k$=ranging value, avgRxk being the average received power of messages involved in the ranging round, is built.

The more metrics which have some correlation with the distance between devices of the transaction are considered, the higher probability is to detect a malicious device. But when using more metrics, more memory and more computing are needed to detect such malicious devices. If all 'good' devices are assumed to transmit at the same power, e.g., at max power (defined by local regulations), the Tx metrics can be removed. If the ranging initiating device is powered by the main power supply and has powerful CPU (typically a controller), a larger number of metrics can be considered. $X_k=(R_k, \text{avgRx}_k, (\delta t_{s,i}, \delta p_{s,i})_{i=1 \ldots nbEchoes})$. But tags have usually very limited computing power. So, for a low-power tag, $X_k$ can be reduced to: $X_{k,tag}=(R_k, \text{avgRx}_k, \delta t_{s,k}, \delta p_{s,k})$ For the sake of simplicity, the same metrics are used for both the tags and controllers. A four-dimensional (4-D) space of data is built, but if a larger number of metrics, the space of data would have a larger dimension. The transactions with good devices should result with data points forming clusters of data and aggregating into some limited-size subspaces. The transactions with a malicious device should be significantly far from the clusters of 'good samples' and appear as outliers. How far the measurement is from the closest cluster of 'good samples' is a measure of how suspicious the transaction is.

Figure 8:
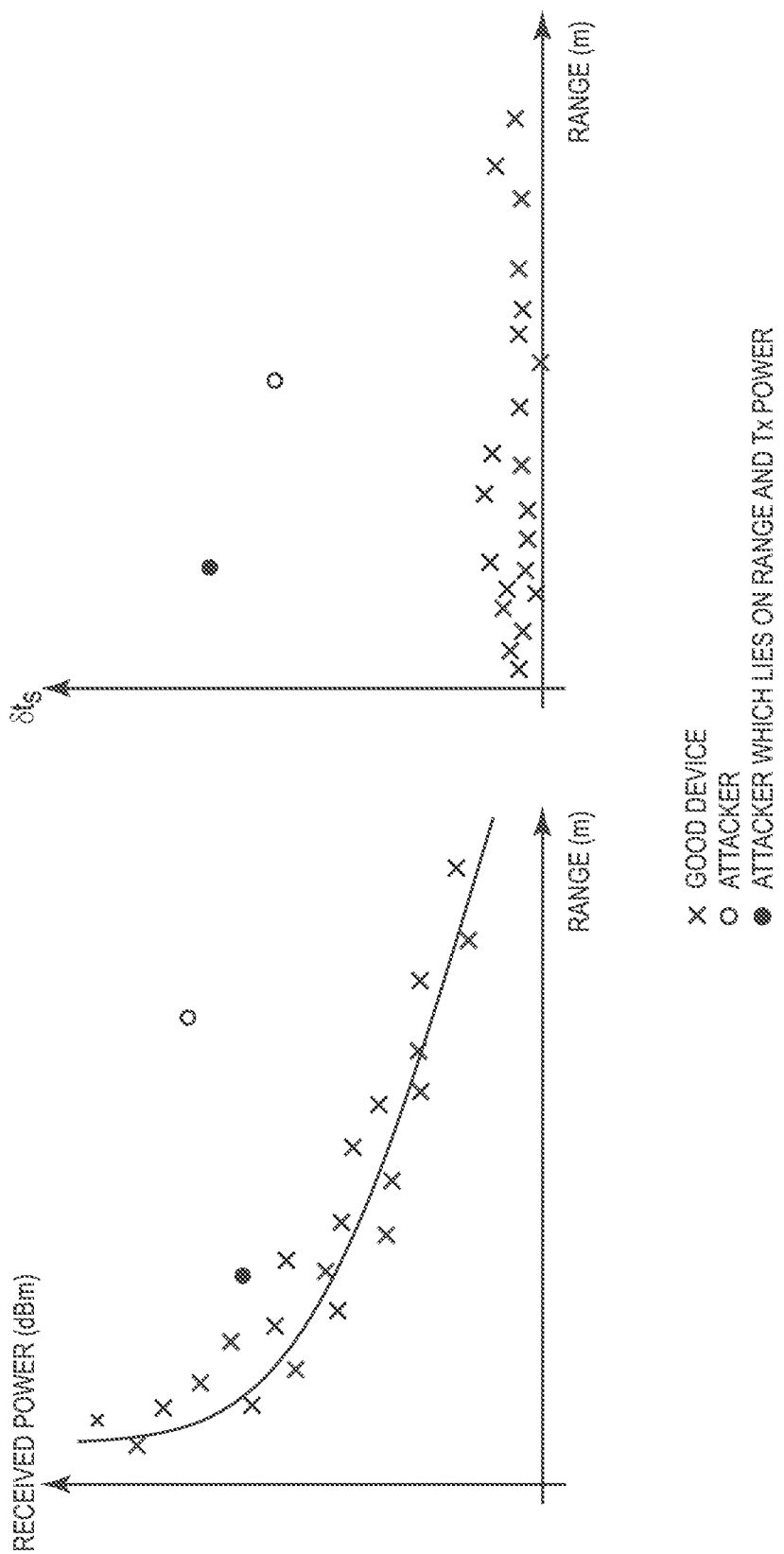
FIG. 8 illustrates the sample points projected into 2D-spaces (Range vs Received Power and Range vs CIR $\delta t_s$) for an easier understanding of the concept, according to some embodiments of the present disclosure.

FIG. 8 illustrates the sample points projected into 2D-spaces (Range vs Received Power and Range vs CIR $\delta t_s$) for an easier understanding of the concept, according to some embodiments of the present disclosure. As shown in the Range vs Received Power graph, one attacker can be discriminated. However, the attacker who lies on range and Tx power appears much closer to the expected values. It might be difficult to determine that this is an attacker. However, the Range vs CIR $\delta t_s$ graph shows that even the lying attacker can be easily discriminated. Using multiple metrics can allow for better determinations of which devices are good devices and which are attackers (or otherwise not working properly).

In some embodiments, for each transaction of a device to be secured, N PHY UWB metrics which have some correlation with the distance between the devices of the transaction are obtained and a N-dimensional vector is created. Then, a hypersurface is determined which sets the boundary between trustable vectors and suspicious vectors based on the history of past transactions. After this hypersurface is created, a new vector is compared with this hypersurface. If it is inside this hypersurface, the vector is considered a good vector (i.e., associated with a good device). If the measurement is outside the hypersurface, a score about the plausibility of the measured ranging is determined based on how different this vector is compared to the past vectors. If the new vector is too different, the values are not inserted in the history so that the history stores only the vectors of good and trustable transactions. In some embodiments, the capability to measure the plausibility of the measured ranging is auto-assessed. The proposed solution may auto-assess its efficiency for a particular PAN.

The methods described herein can be derived from Machine Learning (ML) algorithms to detect anomalies or outliers in a data set or to detect attacks in the flow of data. The signature or the typical vector of a UWB attacker (e.g., a hacker) is by nature unknown and/or unpredictable. In some embodiments, the samples of the ranging vector of a UWB attacker are so sparse compared to the vectors of 'good' transactions that it is difficult to train an algorithm to recognize a pattern of a malicious of transaction using a set of malicious transactions.

In some embodiments, the methods disclosed herein reside in an upper layer on top of MAC. In these embodiments, the inputs can be preferably read in MAC primitives like MCPS-data.lndication or MCPS-data.Confirm, or in MAC Layer Management Entity (MLME) primitives.

Received Power is included in MCPS-data.lndication as linkQuality and is a scaled value which is encoded over one byte. A mechanism embedded in MAC can read the CIR values in the UWB device when a data frame is received. These can be scaled on one or two bytes and included in the MCPS-data.indication. Therefore the measurement vector $X_n$ consists of:
  RCPI (1 byte), scaled to one byte, $x_{1,n}$
  Scaled Ranging value or TOF, coded in 2 bytes, $x_{2,n}$
  CIR dts, coded to 2 bytes, $x_{3,n}$
  CIR dps, coded to 2 bytes, $x_{4,n}$ Implementation 1: Unsupervised Grid Many settings of this algorithm are specific to the PAN and should be tuned for each PAN; they are denoted with the p index.

Clustering of the Samples

Figure 9:
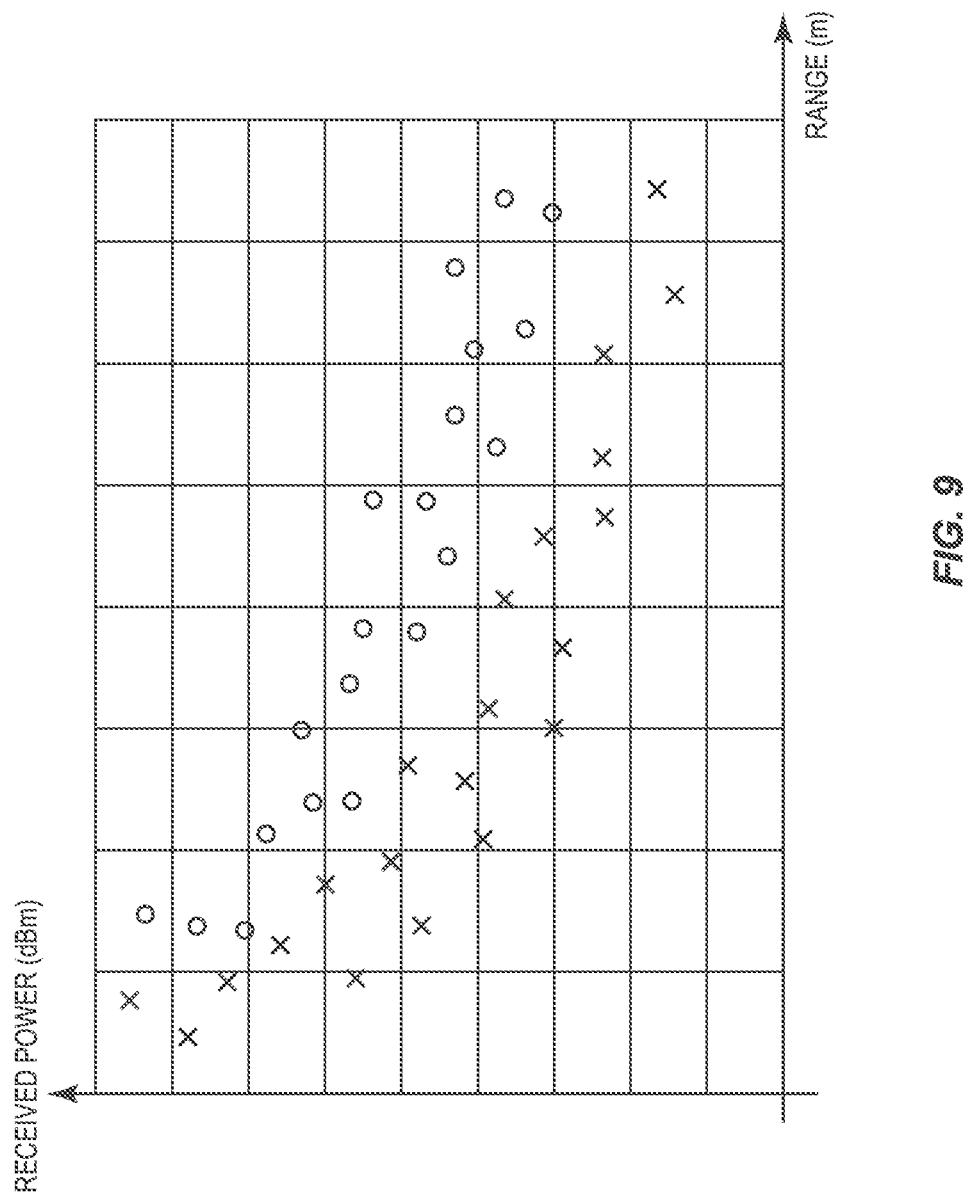
FIG. 9 illustrates the 2D subspace Received Channel Power Indicator (RCPI) vs Range, according to some embodiments of the present disclosure.

Clustering algorithms are algorithms to detect anomalies in a data set when data tend to cluster together inside some hypersurfaces. Anomalies are outliers of the data clusters (see J. Dromard, G. Roudière and P. Owezarski, "Online and Scalable Unsupervised Network Anomaly Detection Method," in IEEE Transactions on Network and Service Management, vol. 14, no. 1, pp. 34-47, March 2017, DOI: 10.1109/TNSM.2016.2627340 and mentioned literature). As explained above, the measured vectors $X_k$ should aggregate in some hypervolumes. To simplify the computing needs, digital grid clustering is done. FIG. 9 illustrates the 2D subspace RCPI vs Range, according to some embodiments of the present disclosure. The size of each cell depends on the PAN. However, in this illustration, each dimension has $2^n$ cells. The dimensions are:

$2^{n1,p}$ for RCPI
$2^{n2,p}$ for TOF
$2^{n3,p}$ for CIR dts
$2^{n4,p}$ for CIR dps $X_n$ belongs to the cell (i, j, k, l), with $i<2^{21,p}$, $j<2^{n2,p}$ ..., where:

$$i=x_{1,n} \gg u1, u1=8-n_{1,p}$$

$$j=x_{2,n} \gg u2, u2=16-n_{2,p}$$

$$k=x_{3,n} \gg u3, u3=16-n_{x,p}$$

$$l=x_{4,n} \gg u4, u4=16-n_{4,p}$$

with » denoting logical right-shifting, 8 or 16 depends on how many bits encode the multiple metrics The cell for each new measurement can be found. As an example, if RCPI dimension has 16 cell-units, any RPCI value between 32 and 47 is projected on the cells whose i=b 2.

Each cell c(i, j, k, l) has a density $d_t(i, j, k, l)$ at time=t. This density is the number of measurement vectors $X_n$ in the recent $W_p$ samples which belong to the cell.

Figure 10:
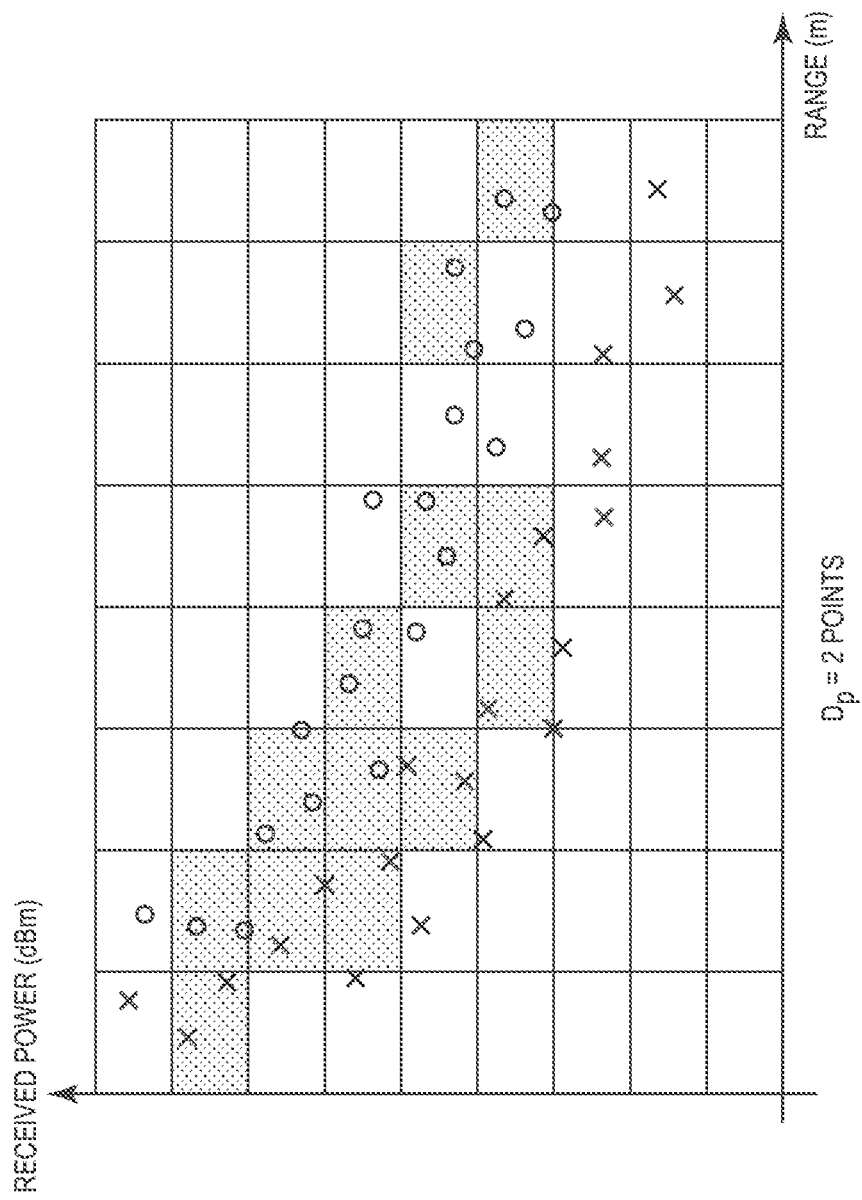
FIG. 10 illustrates the dense cells of FIG. 9 as shaded cells ($D_p$=2), according to some embodiments of the present disclosure.

A cell whose density is higher than $D_p$ is said as dense. $D_p=W_p*\vartheta_p$, where $\vartheta_p$ is between 0 and 1 and depends on the PAN. $S_t$ is the set of dense cells at time t. FIG. 10 illustrates the dense cells of FIG. 9 as shaded cells ($D_p=2$), according to some embodiments of the present disclosure.

Initialization of the Algorithm $W_p$ measurement samples are collected. They are assumed to be 'good samples' and they should be measured with multiple different radio channel configurations. These vectors are put in the 4D grid space and the set of dense cells $S_0$ is determined:

$$S_0=\{c(i,j,k,l)|d_0(i,j,k,l)>D_p\}$$

$Y_0$ is the set of vectors $X_n(n=1 \ldots W_p)$, so that $X_n$ does not belong to a dense cell:

$$Y_0=\{X_n|n=1 \ldots W_p \text{ and } X_n \text{ is not in } S0\}$$

$Z_0$ is the set of all $X_n$: $Y_0=\{X_n|n=1 \ldots W_p\}$

For every vector $X_n$ of $Y_0$, the distance to the closest dense cell is computed:

$$dist_n=\min(distance(X_n,c(i,j,k,l))|c(i,j,k,l) \in S_0)$$

Then the average $\Delta_0$ and variance $\sigma_0$ values of $dist_n$ over $Y_0$ are computed. They represent the average distance and variance of the vectors which are out of the dense cells. An anomaly score is then computed: $A_0=\Delta_0+\beta_p*\sigma_0$, $\beta_p$ is a tuning setting which is specific to the PAN. $S_0$, $Y_0$, $Z_0$ and $A_0$ are the initial state.

New Ranging at Time t

Figure 11:
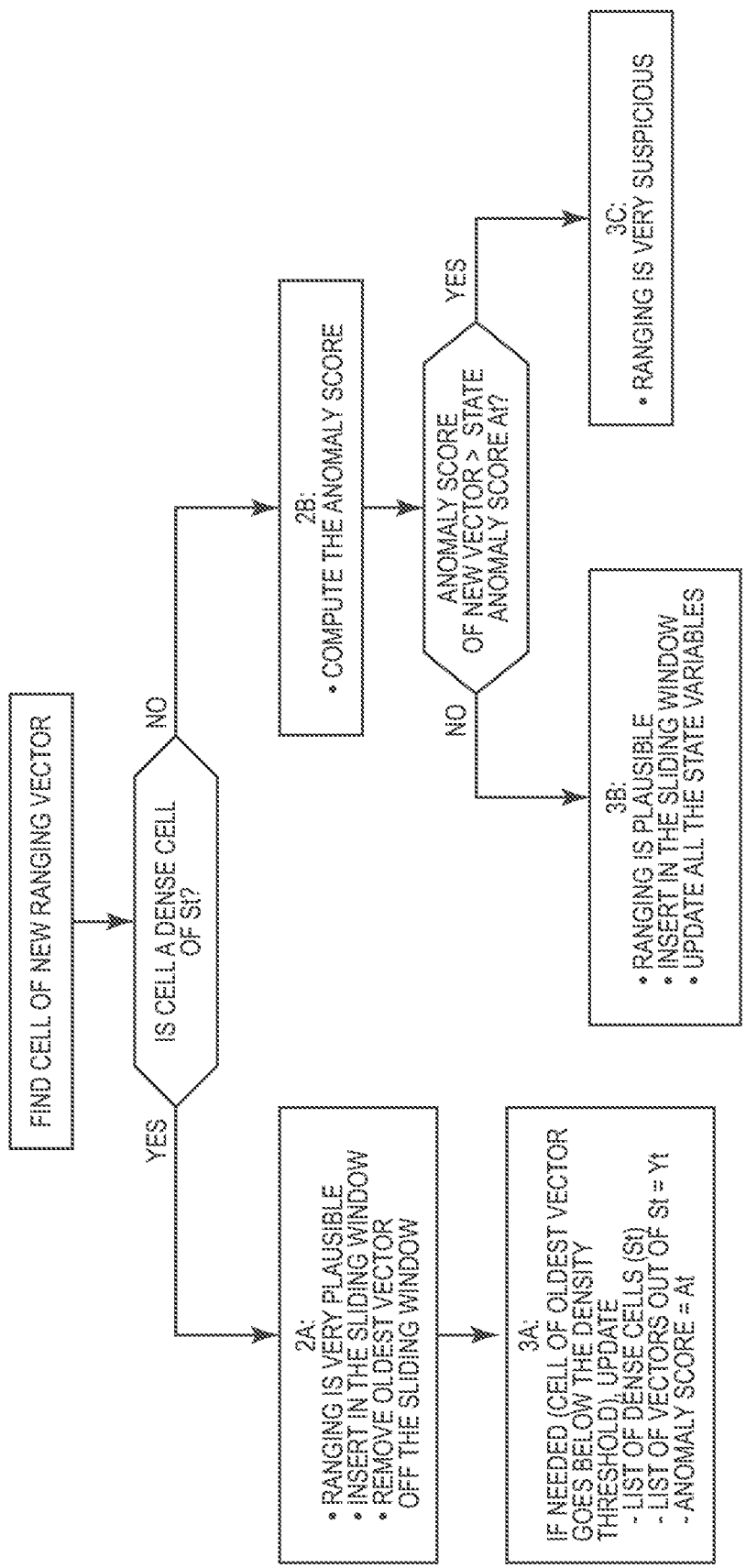
FIG. 11 illustrates a method of determining plausibility of the measurements, according to some embodiments of the present disclosure.

To assess the plausibility of the measured TOF, the recent history of the latest $W_p$ good measurements are used. Using a sliding window keeps the required memory size to a reasonable size and enables auto-adapting to slowly shifting configurations of the PAN. FIG. 11 illustrates a method of determining plausibility of the measurements, according to some embodiments of the present disclosure.

The state variables are: $S_{t-1}$, $Y_{t-1}$, $Z_{t-1}$ and $A_{t-1}$

Step 1: collect the physical metrics to build $X_t$ vector and find its cell

Case A: $X_t$ is in a dense cell of $S_{t-1}$

Step 2.A: The ranging is very plausible. $X_t$ is inserted in the sliding window $Z_t$ and the oldest vector $X_{t-W_p}$ is removed off the sliding window $Z_t$.

Step 3.A: Update of other state variables. The density of the cells of Xt and $X_{t-W_p}$ are updated. $S_t$ and $Y_t$ are updated (the cell $X_{t-W_p}$ may go below the density threshold). Then the state anomaly score $A_t$ is computed if the cell $X_{t-W_p}$ goes below the density threshold and goes in $Y_t$.

Case B: $X_t$ is not in a dense cell of $S_{t-1}$.

Step 2.B: Compute its anomaly score. For that, compute its distance $dist_t$ to the closest dense cells (like in the initialization phase). Compare it to the state anomaly score $A_{t-1}$.

Subcase B1: $dist_t<A_{t-1}$. The ranging is plausible. In this embodiments, $X_t$ is inserted in the sliding window $Z_t$ and the oldest vector $X_{t-W_p}$ is removed the sliding window $Z_t$.

Step 3.B: Update of other state variables. The density of the cells of $X_t$ and $X_{t-W_p}$ are updated. $S_t$ and $Y_t$ are updated (the cell of $X_{t-W_p}$ may go below the density threshold or/and the cell of $X_t$ may become dense). Then the state anomaly $A_t$ score is updated.

Subcase B1: $dist_t>A_{t-1}$. The ranging is suspicious. $X_t$ is not appended in the sliding window.

Instead of delivering a plausibility indicator (very plausible, plausible, suspicious), an analog value derived from the anomaly score can be delivered to the upper layers. According to some embodiments, if multiple consecutive ranging procedures with the same device are tagged as suspicious, the device's MAC address can be put in a blacklist and the device can be filtered out in the MAC Rx layer.

Auto-assessment of the Capability of the Algorithm

In some embodiments, the methods can auto-assess whether it is still capable to determine the plausibility of the ranging procedure. For this purpose, multiple criteria can be defined. These criteria depend on the PAN. Either one of these criteria or a combination can be looked at to auto-assess the algorithm. Criteria 1: Is the number of dense cells of $S_t$ large enough? In other words, is Card $(S_t) < \gamma_p(2^{n1,p}*2^{n2,p}*2^{n3,p}*2^{n4,p})$, with $\gamma_p$ being a PAN-dependent parameter? It could mean that the samples do not cluster as expected or that the method needs to be retuned (e.g., the density threshold or the cell size or both). Criteria 2: Is the number of samples out of the dense cells not too high? In other words, is Card $(Y_t)>\theta_p*W_p$, with $\theta_p$ being a PAN-dependent parameter? This could mean that the samples do not cluster as expected or that the method needs to be retuned (e.g., the density threshold or the cell size or both).

Regarding the complexity of the algorithm, the algorithm invokes basic operations such as: bit-shift, basic math operation and division by integer. This could be accomplished with simple Microcontroller Units (MCUs).

Implementation 2: One-class State Vector Machine (SVM) Algorithm

Many settings of this algorithm are specific to the PAN and should be tuned for each PAN; they are denoted with the p index.

One-class SVM algorithms are algorithms to detect anomalies in a data set and have been used to detect Attacks and Malicious flows in Internet flows (See, e.g., Dennis Ippoliti, Changjun Jiang, Zhijun Ding, and Xiaobo Zhou. 2016. Online Adaptive Anomaly Detection for Augmented Network Flows. ACM Trans. Auton. Adapt. Syst. 11, 3, Article 17 (September 2016), 28 pages. DOI: 10.1145/2934686). Anomalies are outliers of the data set but are very sparse. Supervised algorithms can't be used to train how to discriminate the signatures of malicious vectors versus the good/positive vectors. One-class SVM is well suited to train an unsupervised data set and find a region of the n-D space that contains most of the good data, provided the number of features (or metrics of our measurement vector) is low: it is our case. As for the algorithm 1, it relies on the assumption that a malicious UWB device or a misfunctioning device will yield an outlier in the dataset of measurements.

Figure 12:
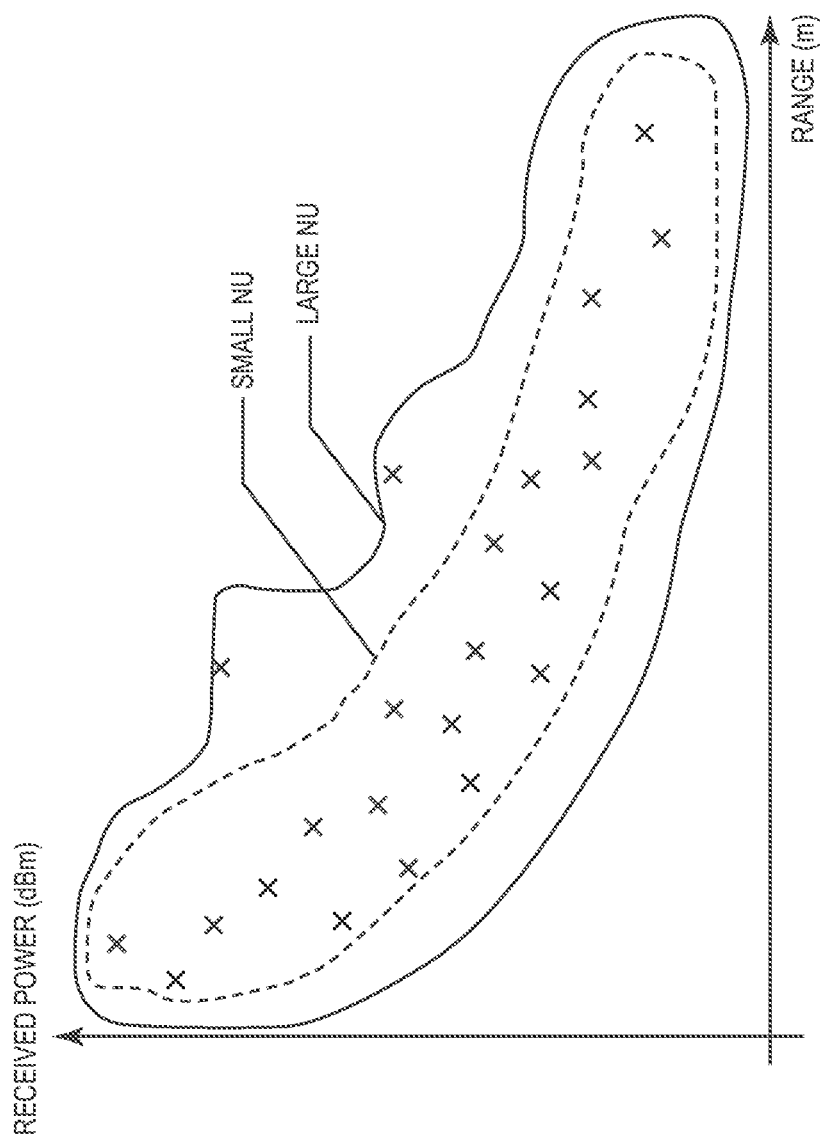
FIG. 12 illustrates the principle when the 4D space of Ultra-WideBand (UWB) Physical layer metrics is projected into the 2D-space (Range vs receive power), according to some embodiments of the present disclosure.

The same metrics are used. The one-class SVM algorithm finds a hypersurface which encompasses all or almost all the positive/good vectors. FIG. 12 illustrates the principle when the 4D space of UWB Physical layer metrics is projected into the 2D-space (Range vs receive power), according to some embodiments of the present disclosure. The Nu parameter is an important parameter. If nu is close to 1, the hypersurface should gather almost all the vectors; but the boundary between good measurements and suspicious measurements tends to overfit the data and is more sensitive to noise measurements. If nu is close to 0, the hypersurface may not include all the measurement vectors, but the decision boundary is smoother and less sensitive to the measurement noise.

This algorithm is much more mathematically intensive than the previous one, requires floating point computation, and can be long and thus drain more electrical power. That is the reason why such an algorithm is well suited for a PAN coordinator and for PAN which are static and do not need frequent online updates of the model.

Initialization of the Algorithm $W_p$ measurement samples are collected. The One-class SVM model is trained with these Wp samples, using gaussian kernels. There are many tuning parameters. For instance, the default tuning parameters which are typically suggested in the literature are discussed. The nu factor shall be tuned so the cross-validation generalizes properly and that the generalization loss $G_0$ (percentage of vectors which are classified as anomaly, e.g., out of the hypersurface, by the prediction model) is below a given threshold.

Figure 13:
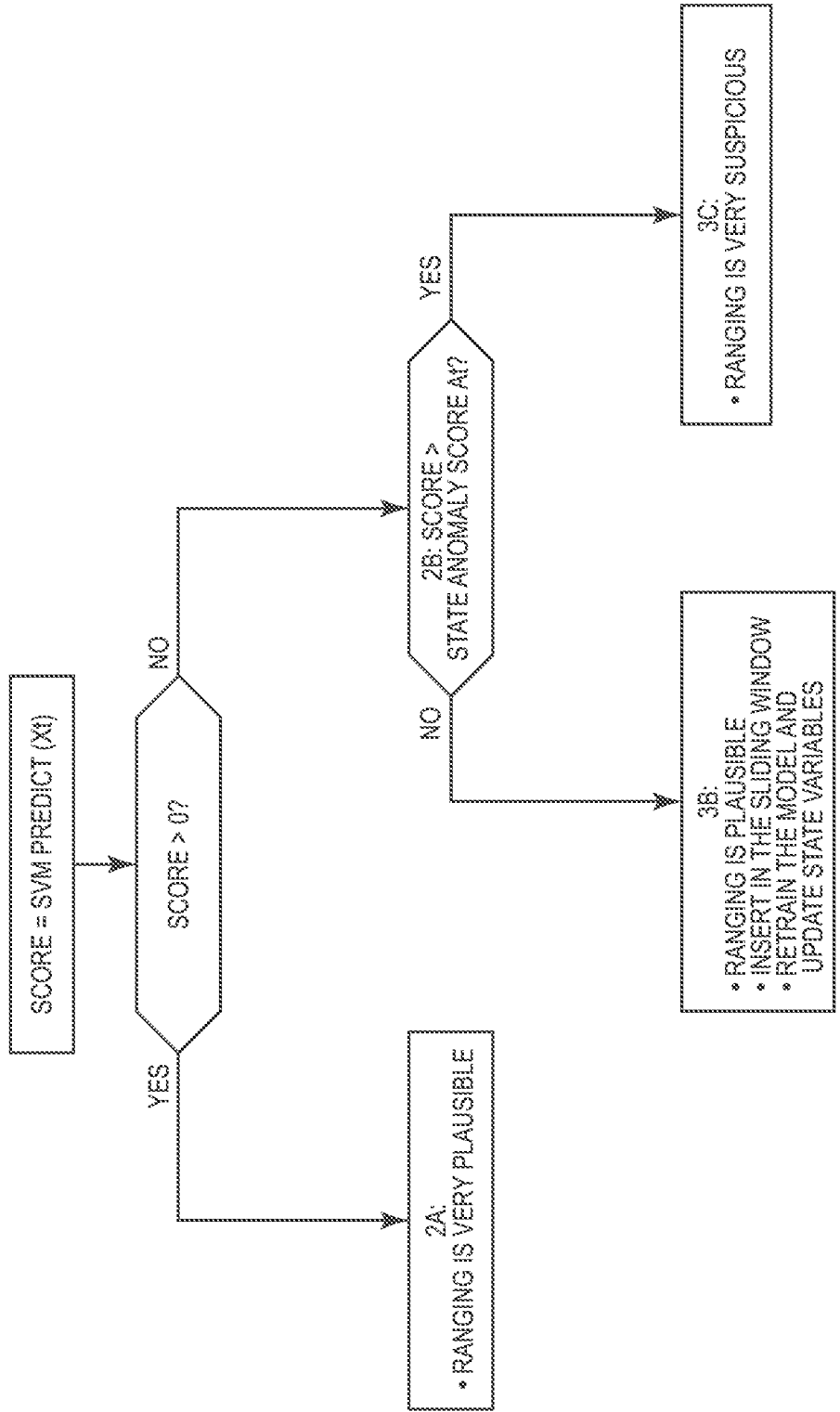
FIG. 13 illustrates a method of determining plausibility of the measurements, according to some embodiments of the present disclosure.

FIG. 13 illustrates a method of determining plausibility of the measurements, according to some embodiments of the present disclosure.

$Z_0$ is the set of all $X_n$ considered in the initial data set and $Y_0$ is the set of $X_n$ which are outside the hypersurface which the model has computed.

Like for the previous algorithm, average score $D_0$ of vectors of $Y_0$ and its variance $s_0$ are computed. The score is the distance of the vector to the boundary of the hypersurface and is an output of the one-class SVM prediction function. Then a State Anomaly score $A_0$ is determined with the formula:

$$A_0 = \Delta_0 + \beta_p * \sigma_0$$

where $\beta_p$ is a tuning setting which is specific to the PAN. The trained model is called $Mdl_0$.

$Y_0$, $Z_0$, $Mdl_0$, $A_0$ and $G_0$ are the initial state.

New ranging at time t:

To assess the plausibility of the measured TOF, the recent history of the latest $W_p$ good measurements are used. Using a sliding window keeps the required memory size to a reasonable size and enables auto-adaptation to slowly shifting configurations of the PAN.

The state variables are: $Y_{t-1}$, $Z_{t-1}$, $A_{t-1}$, $Mdl_{t-1}$ and $G_{t-1}$.

Step 1: collect the physical metrics to build $X_t$ vector and predict whether it is inside the hypersurface of good vectors or outside, using the trained model at t-1. The prediction function also returns a score which is the distance between $X_t$ and the decision boundary in the 4D space.

Case 2.A (score is positive): $X_t$ is inside the surface and then predicted as 'good'. The ranging is very plausible. The state variables (Model, set of observations and generalization loss) are unchanged. Note that although the data set is changed, the model does not need to be updated because the model only depends on the state vectors (data points which define the boundary of the surface, not those which are inside the surface) as per SVM theory.

Case 2B: $X_t$ is predicted as an anomaly vector (its model score is negative).

Step 2.B: Compare $X_t$ score to the state anomaly score $A_{t-1}$.

Subcase 3B: $X_t$ score<$A_{t-1}$. The ranging is plausible. $X_t$ is inserted in the sliding window $Z_t$ and the oldest vector $X_{t-wp}$ is removed off the sliding window $Z_t$. In some embodiments, the model is retrained with this new data set.

Subcase 3C: $X_t > A_{t-1}$. The ranging is suspicious. $X_t$ is not appended in the sliding window.

Instead of delivering a plausibility indicator (very plausible, plausible, suspicious), an analog value derived from the anomaly score can be delivered to the upper layers.

If multiple consecutive ranging procedures with the same device are tagged as suspicious, its MAC address can be put in a blacklist and the device can be filtered out in the MAC Rx layer.

Auto-assessment of the capability of the algorithm.

Each training of the model yields a Generalization Loss. If this loss is below a given threshold, the model auto-assesses that it is not capable anymore to determine the reliability of the ranging procedure.

As discussed above, this algorithm is more complex than the $1^{st}$ one and is dedicated for PAN coordinators and for PAN which are static (the occurrences of retraining the data set are very low).

Some enhancements can be proposed to improve the capability of the device to detect some suspicious transactions, by adding other metrics to help to discriminate good devices vs attacking devices (hacking or misfunctioning devices).

Figure 14:
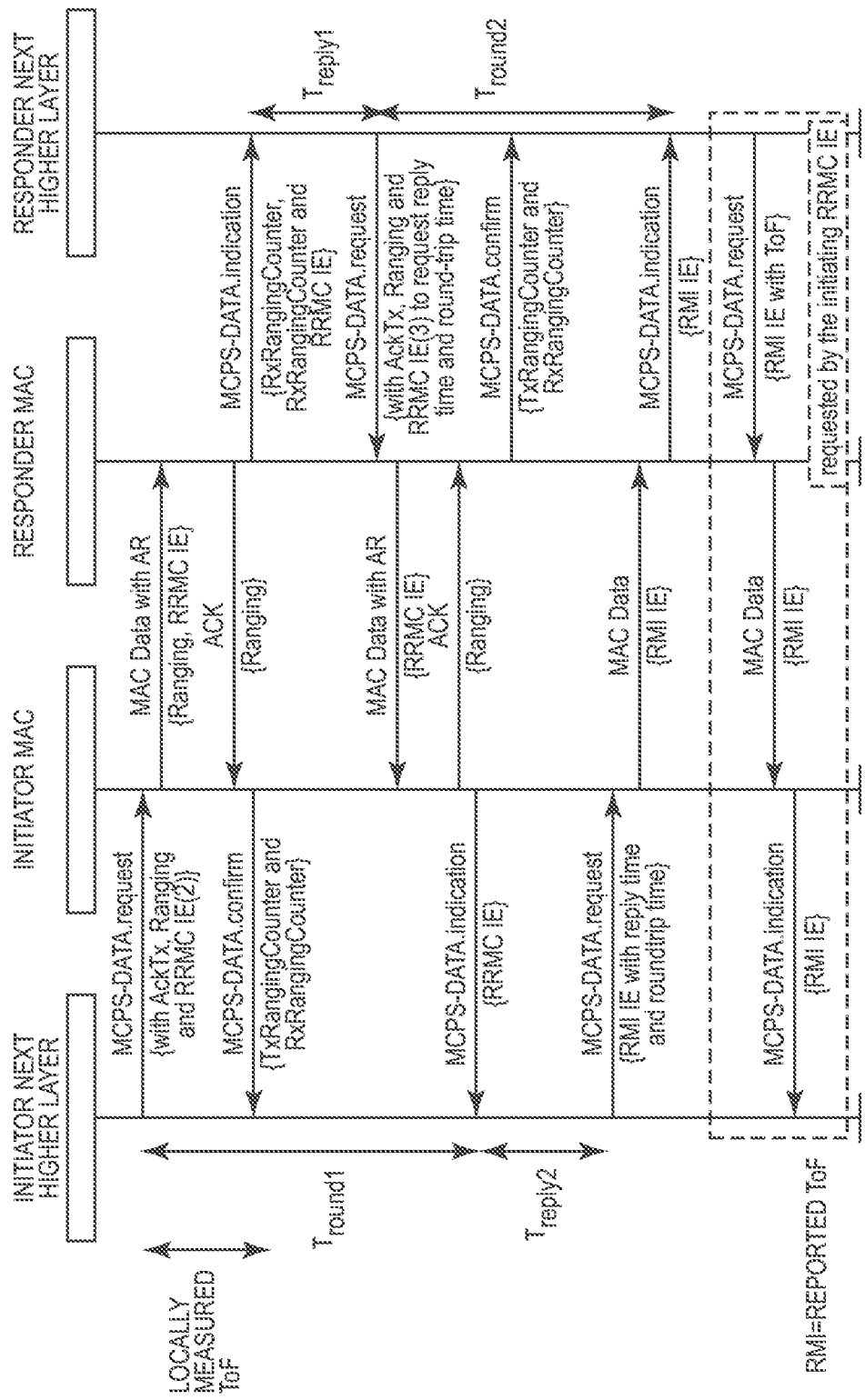
FIG. 14 illustrates an embodiment which adds other metrics, called local TOF or local ranging, which are computed by the initiated device from the delay of the received ACK of sent frames which require to be acknowledged, according to some embodiments of the present disclosure.

FIG. 14 illustrates an embodiment which adds other metrics, called local TOF or local ranging, which are computed by the initiated device from the delay of the received ACK of sent frames which require to be acknowledged, according to some embodiments of the present disclosure.

Ranging is computed based on the reported RMI information in case of double-sided ranging. But the initiating device can also locally measure the TOF based on the arrival time of ACK. The responder device shall transmit its ACK with known and fixed delay Arbitration Interframe Space (AIFS)=12 preamble symbols (aka roughly 12 μs for a device whose Pulse Repetition Frequency (PRF)=16 MHz). Knowing the reply delay, the locally computed distance can be estimated with the formula:

$$\text{locally Computed ranging} = r_k = \frac{Rx\ \text{Counter}(ACK) - Tx\ \text{Counter (ranging frame)} - AIFS}{c}$$

ACK is typically generated by the HW baseband. Therefore, it is more difficult for a malicious device to intentionally lie on AIFS time since Software is not involved on the responding device.

The measurements for $r_k$ and $R_k$ are correlated. Therefore, $r_k$ can be an additional metrics to help to detect a malicious device.

The second enhancement includes requesting some physical measurements on the remote device, particularly to know remote Received Channel Power Indicator (RCPI), Received Signal to Noise Indicator (RSNI).

Spectrum Radio Measurement (SRM) frames can be used for this purpose. In some embodiments, this enhancement is more suited for a PAN device than a fob device because it increases the size of the data set and thus requires more computing power. It also is a procedure which needs more electrical power. However, such enhancement is helpful if the remote device is ready to cooperate and reply to such SRM requests. It could allow detection if the remote device is misfunctioning. FIG. 15 illustrates the expected distribution of the n-D measurement space when projected on the 2D space (local Radio Frequency (RF) power vs remote RF power), according to some embodiments of the present disclosure. In some embodiments, the RF power can be represented by an RCPI value. Typically, local RF power (remote→the device) and remote RF power (the device→remote) should be close, and the vectors of measurements should aggregate around this hyperplane as shown by FIG. 15. Any vector whose projection in this subspace is very far from the line (local RF power=remote RF power) suggests a suspicious ranging.

Those skilled in the art will recognize improvements and modifications to the preferred embodiments of the present disclosure. All such improvements and modifications are considered within the scope of the concepts disclosed herein and the claims that follow.

What is claimed is:

1. A method of assessing a plausibility of a ranging measurement, comprising:
    obtaining the ranging measurement from a remote device;
    obtaining one or more measurements associated with the ranging measurement; and
    based on the one or more measurements associated with the ranging measurement, determining the plausibility of the ranging measurement by comparing the one or more measurements associated with the ranging measurement with a model of expected values for a plausible ranging measurement;
    wherein comparing the one or more measurements associated with the ranging measurement with the model of expected values for a plausible ranging measurement comprises:
        projecting the one or more measurements associated with the ranging measurement into digital cells of an n-dimensional space;
        determining a density of the digital cells and a global state anomaly score;
        determining an anomaly score for the one or more measurements associated with the ranging measurement; and
        determining the plausibility of the ranging measurement by comparing the anomaly score with the global state anomaly score.

2. The method of claim 1 wherein the ranging measurement is part of an Ultra-WideBand (UWB) transaction.

3. The method of claim 2 wherein the one or more measurements associated with the ranging measurement comprise one or more of the group consisting of:
    a received channel power from the remote device;
    a Channel Impulse Response (CIR) associated with the ranging measurement;
    a Time of Flight (ToF) associated with the ranging measurement;
    a received channel power of the remote device; and
    an angle of arrival associated with the ranging measurement.

4. The method of claim 1 wherein the model of expected values for a plausible ranging measurement is the result of an unsupervised clustering algorithm of known plausible ranging measurements.

5. The method of claim 4 wherein the unsupervised clustering algorithm comprises a digital grid clustering algorithm.

6. The method of claim 1 further comprising:
    determining reliability of the model of expected values for a plausible ranging measurement.

7. The method of claim 6 wherein determining the reliability of the model of expected values for a plausible ranging measurement is based on a number of dense cells of the model of expected values and a number of past measurements out of the cluster of dense cells.

8. The method of claim 4 wherein determining the plausibility of the ranging measurement comprises:
    comparing the one or more measurements associated with the ranging measurement with a one-class State Vector Machine (SVM) algorithm which predicts whether the ranging measurement is plausible.

9. The method of claim 8 further comprising:
    if the ranging measurement is determined to not be plausible but within a threshold, retraining the model of expected values using the one or more measurements associated with the ranging measurement.

10. The method of claim 9 further comprising:
    assessing a reliability of the plausibility determination based on a generalization loss of cross-validation done when the model of expected values is trained or retrained.

11. A computing device for assessing a plausibility of a ranging measurement, comprising at least one processor, the at least one processor being configured to:
    obtain the ranging measurement from a remote device;
    obtain one or more measurements associated with the ranging measurement; and
    based on the one or more measurements associated with the ranging measurement, determine the plausibility of the ranging measurement by comparing the one or more measurements associated with the ranging measurement with a model of expected values for a plausible ranging measurement;

wherein comparing the one or more measurements associated with the ranging measurement with the model of expected values for a plausible ranging measurement comprises the at least one processor being configured to:
  project the one or more measurements associated with the ranging measurement into digital cells of an n-dimensional space;
  determine a density of the digital cells and a global state anomaly score;
  determine an anomaly score for the one or more measurements associated with the ranging measurement; and
determine the plausibility of the ranging measurement by comparing the anomaly score with the global state anomaly score.

12. The computing device of claim 11 wherein the ranging measurement is part of an Ultra-WideBand (UWB) transaction.

13. The computing device of claim 12 wherein the one or more measurements associated with the ranging measurement comprise one or more of the group consisting of:
  a received channel power from the remote device;
  a Channel Impulse Response (CIR) associated with the ranging measurement;
  a Time of Flight (ToF) associated with the ranging measurement;
  a received channel power of the remote device; and
  an angle of arrival associated with the ranging measurement.

14. The computing device of claim 11 wherein the model of expected values for a plausible ranging measurement is the result of an unsupervised clustering algorithm of known plausible ranging measurements.

15. The computing device of claim 14 wherein the unsupervised clustering algorithm comprises a digital grid clustering algorithm.

16. The computing device of claim 11 wherein the at least one processor is configured to:
  determine reliability of the model of expected values for a plausible ranging measurement.

17. The computing device of claim 16 wherein determining the reliability of the model of expected values for a plausible ranging measurement is based on a number of dense cells of the model of expected values and a number of past measurements out of the cluster of dense cells.

18. The computing device of claim 14 wherein determining the plausibility of the ranging measurement comprises the at least one processor being further configured to:
  compare the one or more measurements associated with the ranging measurement with a one-class State Vector Machine (SVM) algorithm which predicts whether the ranging measurement is plausible.

19. The computing device of claim 18 wherein the at least one processor is further configured to:
  if the ranging measurement is determined to not be plausible but within a threshold, retrain the model of expected values using the one or more measurements associated with the ranging measurement.

20. The computing device of claim 19 wherein the at least one processor is configured to:
  assess a reliability of the plausibility determination, based on a generalization loss of cross-validation done when the model of expected values is trained or re-trained.

* * * * *

UNITED STATES PATENT AND TRADEMARK OFFICE
CERTIFICATE OF CORRECTION

| | | |
|---|---|---|
| PATENT NO. | : 12,348,972 B2 | Page 1 of 1 |
| APPLICATION NO. | : 17/690409 | |
| DATED | : July 1, 2025 | |
| INVENTOR(S) | : Eric Perraud | |

It is certified that error appears in the above-identified patent and that said Letters Patent is hereby corrected as shown below:

In the Specification

In Column 9, Lines 37 and 38, replace "i=b2" with --i=2--.

In Column 9, Line 39, replace "Each cell c(i, j, k, I) has a density $d_t$(i, j, k, I)" with --Each cell c(i, j, k, l) has a density $d_t$(i, j, k, l)--.

In Column 9, Line 60, replace "$Z_0$ is the set of all $X_n$: $Y_0$={$X_n$|n=1. . .$W_p$}" with --$Z_0$ is the set of all $X_n$: $Y_0$={$X_n$|n=1. . .$W_p$}--.

Signed and Sealed this
Twelfth Day of August, 2025

Coke Morgan Stewart
*Acting Director of the United States Patent and Trademark Office*